United States Patent [19]
Scricca et al.

[11] Patent Number: 5,649,806
[45] Date of Patent: Jul. 22, 1997

[54] ENHANCED FILM COOLING SLOT FOR TURBINE BLADE OUTER AIR SEALS

[75] Inventors: Joseph A. Scricca, Jupiter; George W. Kelch, Palm Beach Gardens, both of Fla.

[73] Assignee: United Technologies Corporation, Hartford, Conn.

[21] Appl. No.: 155,989

[22] Filed: Nov. 22, 1993

[51] Int. Cl.$^6$ .................................................. F01D 5/18
[52] U.S. Cl. ........................................ 415/115; 415/116
[58] Field of Search .................................. 415/115, 116, 415/117

[56] References Cited

U.S. PATENT DOCUMENTS

| | | | |
|---|---|---|---|
| 4,013,376 | 3/1977 | Bisson et al. | 415/117 |
| 4,017,213 | 4/1977 | Przirembel | 415/115 |
| 4,732,531 | 3/1988 | Minoda et al. | 415/115 |
| 5,030,060 | 7/1991 | Laing | 415/115 |
| 5,092,735 | 3/1992 | Katy et al. | 415/116 |
| 5,169,287 | 12/1992 | Proctor | 415/115 |
| 5,197,852 | 3/1993 | Walker et al. | 415/115 |

*Primary Examiner*—John T. Kwon

[57] ABSTRACT

This disclosure describes a cooling enhancement for gas turbine engine outer air seals. The invention provides heat transfer using impingement cooling and convective cooling through the use of tortuous cooling air passages, and film effective film cooling through the use of cooling air discharge slots that are oriented so as to discharge coolant into the working fluid flowpath with a minimum of momentum exchange between the cooling air and the working fluid.

16 Claims, 3 Drawing Sheets

ENHANCED FILM COOLING SLOT FOR TURBINE BLADE OUTER AIR SEALS

DESCRIPTION

1. Field of the Invention

This invention relates to gas turbine engines of the type having an annular flow path for working fluid. The invention is particularly related to a seal formed from several seal segments that extend circumferentially about the engine's longitudinal axis, and confine the working fluid to the flow path.

2. Background Art

An axial flow, gas turbine engine has a compression section, a combustion section and a turbine section. An annular flow path for the working fluid extends axially through the sections. A stator assembly extends about the annular flow path for confining the working fluid to the flow path and for directing the fluid along the flow path.

As the working fluid flows along the flow path, the working fluid is pressurized in the compression section and burned with fuel in the combustion section to add energy to the working fluid. The hot, pressurized working fluid is expanded through the turbine section to produce work. A major portion of this work is used for driving a free turbine or developing thrust for an aircraft.

A remaining portion of the work generated by the turbine section is not used for these purposes. Instead it is used to compress the working fluid itself. A rotor assembly extends between the turbine section and the compression section to transfer this work from the turbine section to the compression section. The rotor assembly in the turbine section has rotor blades which extend outwardly across the working medium flow path. The rotor blades have airfoils which are angled with respect to the approaching flow to receive work from the working fluid and to drive the rotor assembly about the axis of rotation.

An outer air seal circumscribes the rotor blades to confine the working fluid to the flow path. The outer air seal is part of the stator structure and is formed of a plurality of arcuate segments. The stator assembly further includes an outer case and a structure for supporting the segments of the outer air seal from the outer case. The outer case and the support structure position the seal segments in close proximity to the blades to block the leakage of the working fluid past the tips of the blades. As a result, the segments are in intimate contact with the hot working fluid, receive heat from the working fluid and are cooled to keep the temperature of the segments within acceptable limits.

The gas turbine blade outer air seals are part of the turbine engine's outer flow path adjacent to the blade tips, and as such are subjected to the severe thermal conditions in the turbine environment. Most blade outer air seals are metallic, and some may also have a ceramic coating used for thermal insulation from the hot flow path conditions. A tight clearance between the blade tip and the blade outer air seals is necessary to maintain good operating performance.

The use of cooling air increases the service life of the outer air seal in comparison to uncooled outer air seals. However, the use of cooling air decreases the operating efficiency of the engine because a portion of the engine's useful work is used to pressurize the cooling air in the compressor. A decrease in the amount of cooling air required to provide a satisfactory service life for components such as the outer air seal increases the work available for other purposes, such as providing thrust or powering a free turbine, and increases the overall engine efficiency.

Accordingly, what is needed is an outer air seal that minimizes the need for cooling air while providing the cooling necessary to extend the useful life of the outer air seal.

SUMMARY OF THE INVENTION

It is therefore an object of the present invention to provide an outer air seal that minimizes the need for cooling air while providing the cooling necessary to extend the useful life of the outer air seal.

Another object of the present invention is to combine impingement, pedestal and slot film cooling into one distinct feature for use in gas turbine engine blade outer air seals.

Another object of the present invention is to align the cooling air film with the working fluid flowpath boundary layer trajectory to minimize turbulence momentum exchange between the cooling air and the working fluid.

Accordingly, this invention provides a cooling enhancement for a gas turbine engine blade outer air seal. The seal is made up of a plurality of arcuate seal segments having internal cooling passages, a plurality of cooling air inlet orifices in one surface, and a plurality of cooling slots for film cooling on an opposite surface. Metering of the cooling air, and the direction thereof, is controlled as cooling air enters the internal passages through the orifices from a cooling air supply cavity. The orifices direct the cooling air to strike the inner surface of the passage opposite the orifices, cooling that inner surface through impingement cooling. The cooling air then flows through a pedestal array which improves the convective heat transfer by forcing the cooling air to flow through labyrinth-like flow paths formed by the rows of pedestals that, in effect, reduce the hydraulic diameter of the passage. Thus, the pedestals increase the convective heat transfer coefficients and also help to increase the conduction from the sealing surface of the seal segment into the colder support structure. Finally, the cooling air exits through film cooling slots in the substrate and sealing surface, where it forms a film layer attached to the sealing surface of the blade outer air seal exposed to the working fluid of the gas turbine engine. The film cooling slots are elongated, and some of the film cooling slots are oriented so that the longitudinal axis thereof is tangential to the contour of each turbine blade as the blade passes over a particular cooling slot. Such orientation of film slots results in discharge of the cooling air on the trajectory of the working fluid flowpath boundary layer, thereby enhancing the blade outer air seal film coverage. Directing the film along this trajectory minimizes the momentum exchange in the boundary layer which reduces mixing and turbulence, thereby improving the film cooling effectiveness.

The foregoing and other features and advantages of the present invention will become more apparent from the following description and accompanying drawings.

BEST MODE FOR CARRYING OUT THE INVENTION

Figure 1:
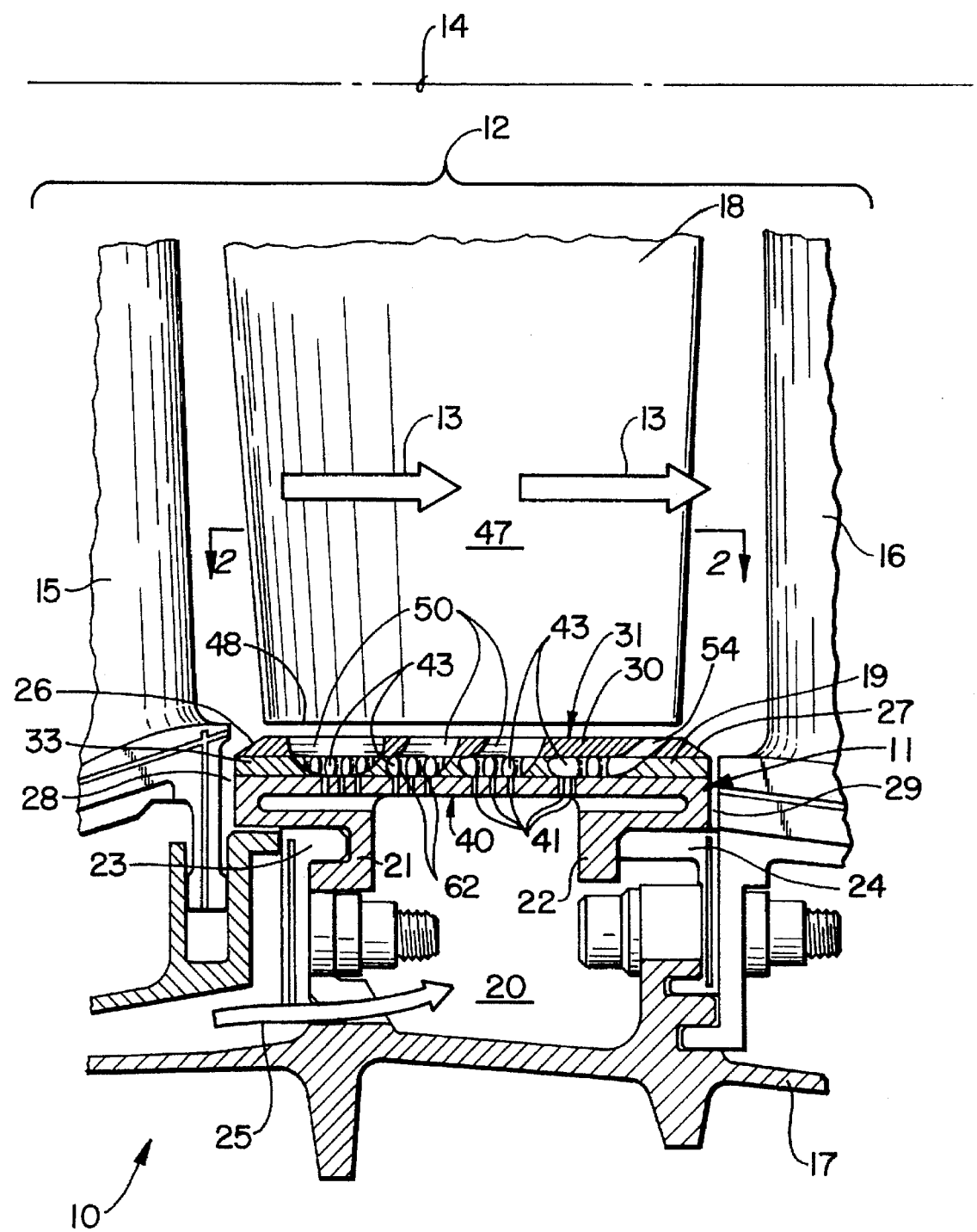
FIG. 1 is a cross sectional view of a portion of a gas turbine engine incorporating the seal of the present invention.

FIG. 1 shows a portion of an axial flow gas turbine engine 10 having an axis of rotation 14 defined therethrough and incorporating the seal 11 of the present invention. A portion of one rotor stage 12 of the turbine of the engine 10 is shown in FIG. 1 and includes an annular flow path 13 disposed about the axis 14 for the combustion gases that are the working fluid of the engine. The turbine stage 12 has one stator assembly 15 axially upstream of the stage 12, and another stator assembly 16 axially downstream thereof. The stators 15, 16 are part of the static structure of the engine 10, and each stator assembly 15, 16 includes an outer case 17. The outer case 17 extends circumferentially around the flow path 13 of working fluid.

The turbine stage 12 has a plurality of rotor blades, which are represented by the single rotor blade 18 in FIG. 1, that extend radially outward relative to the axis 14 across the flow path 13 into close proximity with the outer case 17. An outer air seal 11 made up of a plurality of arcuate seal segments (represented by the single seal segment 19 in FIG. 1) extends about the axis 14 to bound the annular flow path 13, and the seal 11 circumscribes the tips of the rotor blades 18. The outer air seal 11 is spaced radially inwardly from the outer case 17 leaving a circumferentially extending cavity 20 therebetween. The cavity 20 is in flow communication with a source of cooling air (not shown) for cooling the segments 19 of the seal 11 as discussed below. Each arcuate seal segment 19 has an upstream hook 21 and a downstream attachment member 22 to engage upstream and downstream supports 23, 24, respectively, which extend inwardly from the outer case 17. The supports 23, 24 are attached to the outer case 17 to support and position the outer air seal 11 about the rotor blades 18. Each support 23, 24 may be segmented to reduce the hoop strength of the support 23, 24.

A first flow path 25 for cooling air extends inwardly of the outer case 17. The cooling air flow path is bounded by the outer case 17 and extends through the engine outwardly of the flow path 13 of the working fluid. The cooling air flow path extends into the cavity 20 between the outer air seal 11 and the outer case 17.

Each seal segment 19 of the outer air seal 11 has a leading edge 26 and a trailing edge 27. The leading edge 26 is in spaced relation to the adjacent stator assembly 15 leaving a circumferentially extending cavity 28 therebetween. The cavity 28 forms a second cooling air flow path which extends axially and circumferentially beneath the leading edge region. The trailing edge 27 is in spaced relation to adjacent stator assembly 16 leaving an annular cavity 29 therebetween which forms a third cooling air flow path.

Each seal segment 19 has a metallic base 30 that has an arcuate sealing surface 31 that extends circumferentially about the axis 14. The metallic base 30 is integral with a substrate 33 that incorporates the hook 21 and the attachment member 22. Adjacent seal segments are spaced circumferentially from each other leaving an inter-segment gap therebetween to allow for thermal expansion of the segments 19. The inter-segment gap varies in size under operative conditions of the engine 10.

As those skilled in the art will readily appreciate, due to the extremely high temperature of the working fluid, the segments 19 of the outer air seal 11 absorb heat from the working fluid. The metallic base 30 is made of a material that would have relatively low creep strength at the temperature of the working fluid, and therefore each of the segments 19 must be cooled to maintain the temperature of the metallic base 30 well below the temperature of the working fluid.

Referring again to FIG. 1, the sealing surface 31 of each segment faces the turbine blades 18 and the working medium flow path 13. A portion of the sealing surface 31 of each segment 19 radially outward from the blade tip preferably includes a coating of an abradable material, and another portion of the sealing surface 31 at the leading and trailing edges 26, 27 preferably includes a coating of a thermal barrier material. Such abradable and thermal barrier materials are well known in the art, and therefore are not detailed further in this disclosure. Opposite the sealing surface 31, and radially outward therefrom, is a coolant supply surface 40 that is substantially parallel to, but offset from, the sealing surface 31. The coolant supply surface 40 has a plurality of cooling air inlet orifices 41 extending therethrough. These orifices 41 are sized to meter the flow of cooling air therethrough based on the supply pressure of the cooling air and the desired heat transfer from the seal segments 19.

Each segment 19 has a plurality of cooling air passages 43 located between the sealing surface 31 and the coolant supply surface 40, as shown in FIG. 1. The cooling air passages 43 extend from one or more of the orifices 41 toward elongate film cooling slots 50, 54 in the sealing surface 31, and each of these cooling air passages 43 intersects the sealing surface 31 at a film cooling slot 50, 54. Each cooling air passage 43 communicates with the supply of cooling air in the cavity 20 of the static structure through one of the cooling air inlet orifices 41.

In view of the foregoing discussion, it should be apparent that, within a particular segment 19, the cooling air from the supply in the cavity 20 flows through the cooling air passages 43 in one direction and exits into the working fluid 13 at the sealing surface 31 through the slots 50, 54.

Figure 2:
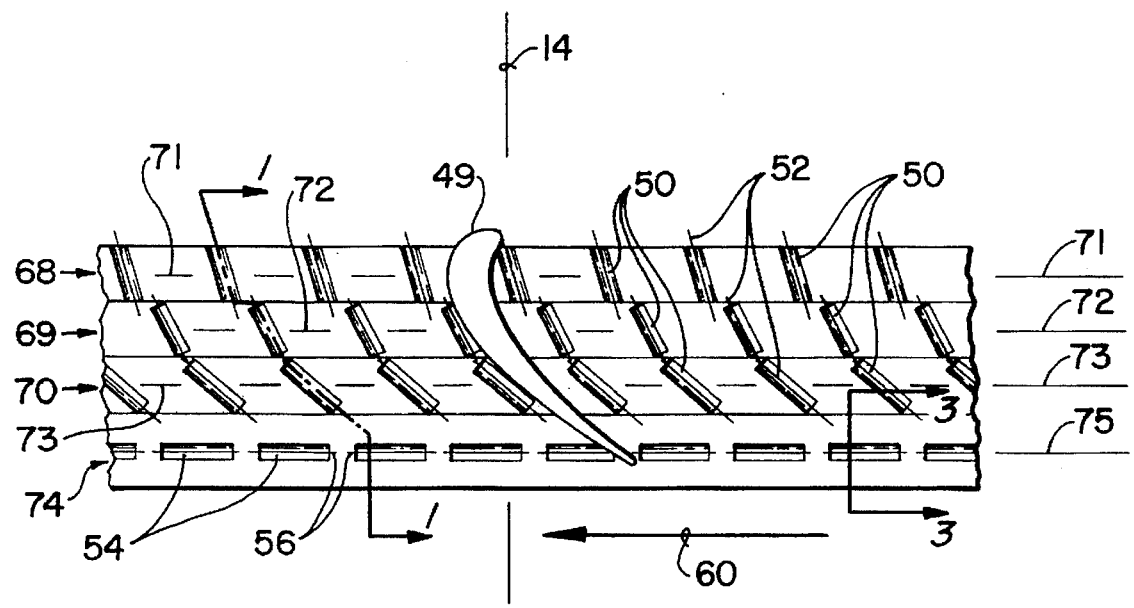
FIG. 2 is a plan view of a portion of an arcuate segment of the present seal taken along line 2—2 of FIG. 1 showing the blade contour.

Each blade 47 has an airfoil surface 47 extending radially outward from the axis 14 and terminating at a blade tip 48. The tip 48 of each blade 47 is in spaced relation to the annular seal 11, and the airfoil surface 47 immediately adjacent the seal 11 defines a blade tip contour 49, as shown in FIG. 2. The plurality of arcuate seal segments 19 extends circumferentially about the flow path 13, and each segment 19 is spaced radially outward from the blades 47.

The sealing surface 31 of each seal segment 19 has a plurality of first cooling slots 50, as shown in FIG. 2. Each elongate first cooling slot 50 is alternately covered and uncovered as the tip 48 of each blade 47 of the turbine rotor rotates past the cooling slot 50 in the direction 60 shown in FIG. 2. For clarity purposes only one blade tip contour 49 is shown in FIG. 2, but it is to be understood that the blade tips of the remaining blades 47 of the rotor stage likewise move in the direction 60 indicated at a similar orientation. Each of the first cooling slots 50 has a first longitudinal axis 52 defined therethrough, and each first cooling slot 50 is oriented such that the first longitudinal axis 52 thereof is substantially tangential to the contour 49 of each blade tip 48 as the tip rotates past the slot 50. Each seal segment 19 also has a plurality of trailing edge cooling slots 54 which constitute a second plurality of elongate cooling slots 54. Each second cooling slot 54 has a second longitudinal axis 56 defined therethrough, and each of the second longitudinal axes 56 is substantially perpendicular to the axis of rotation 14.

Each of the plurality of cooling air inlet orifices 41 extends through the supply surface 40 and into the segment 19 and connects to one of the cooling air passages 43 located between the supply surface 40 and said sealing surface 31. Each passage 43 terminates at a cooling slot 50, 54, thereby connecting each of the cooling slots 50, 54 to at least one of the cooling air inlet orifices 41. Thus, each of the first and second cooling slots 50, 54 communicates with at least one of the inlet orifices 41 through one of the cooling air passages 43.

Figure 4:
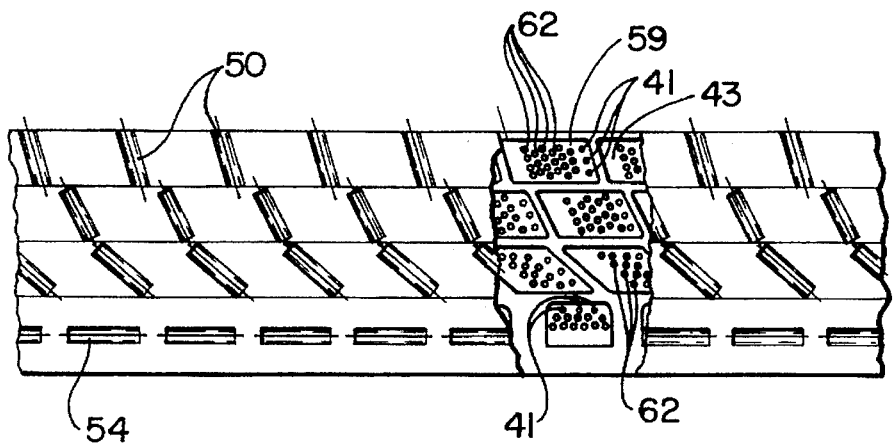
FIG. 4 is a partially broken away plan view of the segment of FIG. 2 omitting the blade contour showing the passages, pedestals and orifices through which the cooling air passes.
Figure 3:
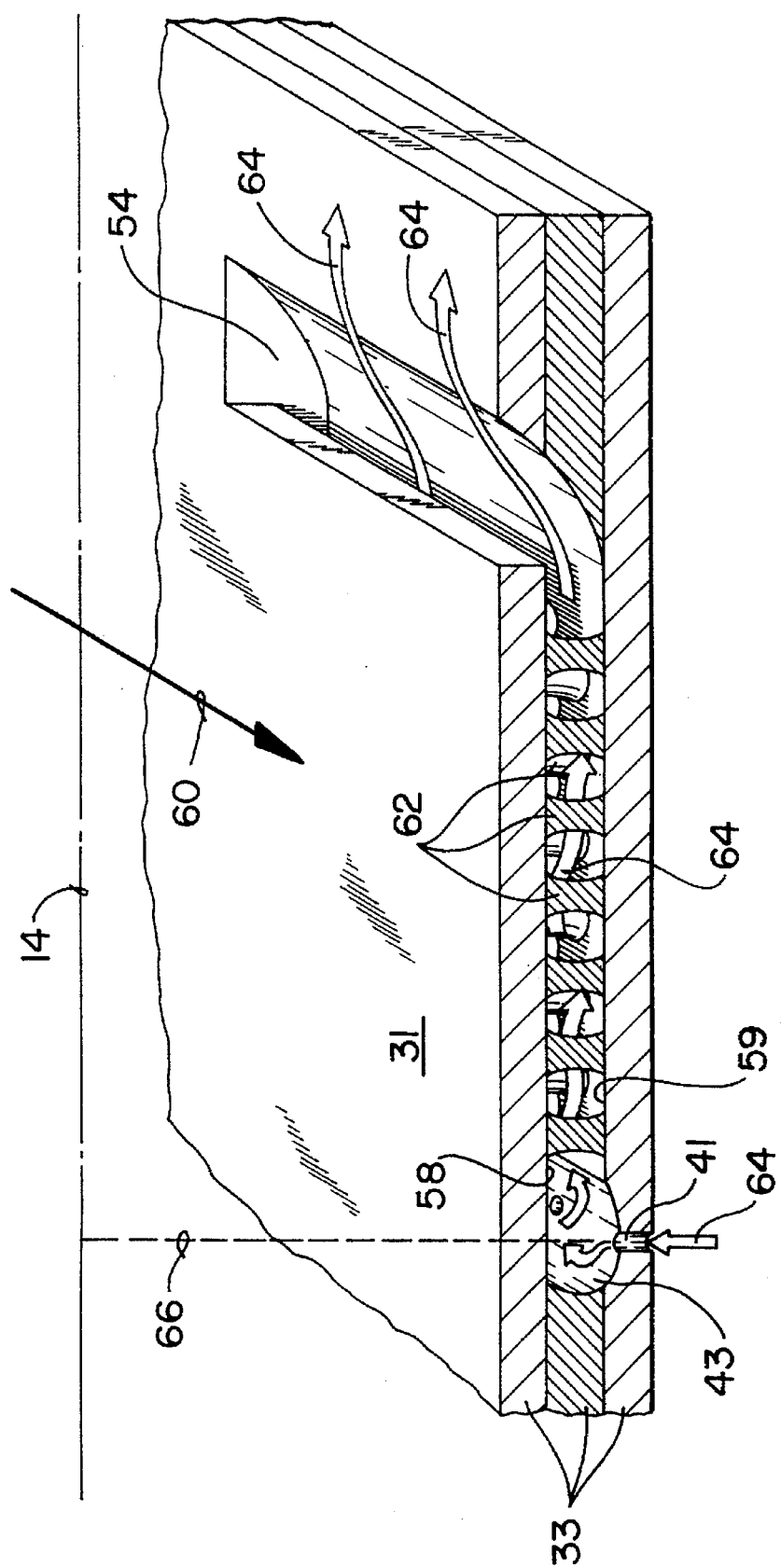
FIG. 3 is a cross sectional view of one of the passages of the seal of the present invention taken along line 3—3 of FIG. 2.

As shown in FIGS. 3 and 4, each passage 43 has a first inner passage surface 58, and a second inner passage surface 59 radially outward (relative to the axis of rotation) of the first inner passage surface 58. A plurality of pedestals 62 extend radially from the axis of rotation 14 and each pedestal 62 connects the first inner passage surface 58 of one of the passages 43 to the second inner passage surface 59 of the same passage 43. The pedestals 62 provide a tortuous flow path for cooling air 64 entering the passage 43 through one of the cooling air inlet orifices 41 and flowing through the passage 43 to the cooling slot 50, 54 in communication therewith. Additionally, the pedestals 62 are load bearing members that support the sealing surface 31 to prevent the passage 43 from collapsing should the blade tip 48 rub the sealing surface 31 during engine operation.

The axis of rotation 14 and each cooling air inlet orifice 41 defines a reference line 66 that is perpendicular to the axis of rotation 14, as shown in FIG. 3. The cooling slot 50, 54 in communication with each cooling air inlet orifice 41 is in spaced relation to the reference line 66 thereof, thereby causing cooling air 64 entering a given passage 43 through one of the cooling air inlet orifices 41 to impinge the first inner passage surface 58, and subsequently flow circumferentially within the segment 19 through the pedestals 62 prior to exiting the passage 43 through the cooling slot 50, 54 in communication therewith.

As those skilled in the art will readily appreciate, each passage 43 has a minimum passage flow area, and each of the cooling air inlet orifices 41 likewise has a minimum inlet orifice flow area that controls the amount of cooling air 64 that flows therethrough. The sum of the minimum flow areas of the cooling air inlet orifices 41 in communication with a given passage 43 effectively controls the amount of air 64 that can enter that passage 43 for a given pressure differential across the orifice 41. The minimum passage flow area is preferably at least twice the sum of the flow areas of the cooling air inlet orifices 41 in communication therewith to ensure that the cooling air 64 that impinges the first inner passage surface 58 has sufficient velocity to yield highly turbulent heat transfer.

Referring again to FIG. 2, the first cooling slots are aligned in one or more rows 68, 69, 70, each row defining a reference plane 71, 72, 73 that is perpendicular to the axis of rotation 14. Preferably, some of the first cooling slots 50 are aligned in a first row 68, defining a first reference plane 71 perpendicular to the axis of rotation 14, and the second cooling slots 54 are aligned in a second row 74 that defines a second reference plane 75 perpendicular to the axis of rotation 14. Additionally, some of the first cooling slots 50 are aligned in a third row 69 and a fourth row 70, wherein the third row 69 defines a third reference plane 72 perpendicular to the axis of rotation 14 and the fourth row 70 defines a fourth reference plane 73 perpendicular to the axis of rotation 14. The third reference plane 72 is interposed between the first 71 and second 75 reference planes, and the fourth reference plane 73 is interposed between the third 72 and second 75 reference planes.

In operation, cooling air 64 flows into the tapered cooling air passages 43 of the present invention through the metering orifices 41 located at the supply surface 40 of the seal segment 19. The cooling air 64 impinges the first inner passage surface 58 thereby cooling the substrate 33 radially outward of the sealing surface 31. The cooling air 64 then flows through the pedestals 62 which create turbulence in the cooling air 64 by providing tortuous flow paths through each passage 43, thereby increasing the internal heat transfer coefficient of the cooling air 64. The spent cooling air 64 then exits the passage 43 through one of the slots 50, 54 to provide film cooling of the sealing surface 31. Additionally, the size of the metering orifices 41 can be varied for individual cooling air passage flow control, adding the capability to match the cooling potential to heat flux by increasing the cooling air flow to the "hot spots" along the axial chord of each segment 19, and decreasing the coolant flow to "cool spots", thereby reducing the over-all cooling air flow requirement.

As those skilled in the art will readily appreciate, orienting some of the film cooling slots 50 so that the longitudinal axis 52 thereof is tangential to the contour 49 of each turbine blade 47 as the blade 47 passes over a particular cooling slot 50 results in discharge of the cooling air 64 along the trajectory of the working fluid flowpath boundary layer. This enhances the blade outer air seal 11 film coverage while minimizing the momentum exchange in the boundary layer which reduces mixing and turbulence, thereby improving the film cooling effectiveness.

The seal 11 of the present invention provides a cooling configuration that contains features whereby the cooling air passage entrance and exit locations may be used to provide the fabrication core support to enhance part castability, and may be cast with a high strength, high temperature turbine material. The cooling effectiveness of the pedestal 62 arrays may be matched to the primary flow path heat flux by varying the coolant flow rate to the individual rows of passages 68, 69, 70, 74, while the load bearing ability of the pedestals 62 yields a rub tolerant blade outer air seal 11. The pedestals 62 reinforce the film cooling slots 50, 54, which are oriented so as to avoid plugging, and are compatible with an abradable coating without reducing cooling flow. In addition to abradable coatings to improve seal performance, the blade outer air seal 11 of the present invention may also use a combination of sealing surface coatings such as oxidation/erosion resistant coatings to extend seal 11 life, and thermal barrier coatings to reduce operating temperatures of the seals 11.

Although this invention has been shown and described with respect to a detailed embodiment thereof, it will be understood by those skilled in the art that various changes in form and detail thereof may be made without departing from the spirit and scope of the claimed invention.

We claim:

1. An annular seal for a gas turbine engine, said engine having an axis of rotation defined therethrough, an annular flow path concentric with said axis for working fluid flowing through at least one rotor stage of said engine, said flow path bounded by a static structure, said annular seal secured to said static structure radially outward of said one stage, said one stage including a plurality of substantially similar blades, each blade having an airfoil surface extending radially outward from said axis and terminating at a blade tip, each blade tip in spaced relation to said annular seal, said airfoil surface immediately adjacent said seal defining a blade tip contour, said seal absorbing heat from said working fluid and comprising:

a plurality of arcuate seal segments extending circumferentially about the flow path, each segment spaced radially outward from said blades, each segment spaced circumferentially from each adjacent segment, each seal segment including a sealing surface facing the working fluid flow path and including a plurality of elongate first cooling slots, each first cooling slot alternately covered and uncovered as the tip of each blade of said rotor rotates past the first cooling slot, each of said first cooling slots having a first longitudinal axis defined therethrough, and the first longitudinal axis of each first cooling slot is substantially tangential to the contour of each blade tip.

2. The seal of claim 1 wherein each seal segment further comprises a supply surface radially outward from said sealing surface, a plurality of cooling air inlet orifices extending through said supply surface and into said segment, and a plurality of cooling air passages located entirely between said supply surface and said sealing surface, each passage connecting one of said first cooling slots to at least one of said one cooling air inlet orifices, each of said first cooling slots communicating with at least one of said inlet orifices through one of said cooling air passages.

3. The seal of claim 2 wherein each passage has a first inner passage surface, and a second inner passage surface radially outward of said first inner passage surface relative to the axis of rotation, each segment includes a plurality of pedestals extending radially of said axis of rotation, and each pedestal connects the first inner passage surface of one of the passages to the second inner passage surface thereof, said pedestals providing a tortuous flow path for cooling air entering the passage through one of said cooling air inlet orifices and flowing through the passage to the cooling slot in communication therewith.

4. The seal of claim 3 wherein each cooling air inlet orifice and the axis of rotation define a reference line that is perpendicular to said axis of rotation, and the cooling slot in communication with each cooling air inlet orifice is in spaced relation to said reference line, thereby causing cooling air entering the passage through one of the cooling air inlet orifices to impinge the first inner passage surface prior to exiting the passage through the cooling slot in communication therewith.

5. The seal of claim 4 wherein each passage has a minimum passage flow area, each of the cooling air inlet orifices has a minimum inlet orifice flow area, and the minimum passage flow area is at least twice the sum of the flow areas of the cooling air inlet orifices in communication therewith.

6. The seal of claim 5 wherein at least some of the first cooling slots are aligned in a first row, said first row defines a first reference plane perpendicular to said axis of rotation.

7. The seal of claim 6 wherein some of the first cooling slots are aligned in a second row, said second row defines a second reference plane perpendicular to said axis of rotation, and the second reference plane is in spaced relation to the first reference plane.

8. The seal of claim 7 wherein some of the first cooling slots are aligned in a third row, said third row defines a third reference plane perpendicular to said axis of rotation, and the second reference plane is interposed between the first and third reference planes.

9. The seal of claim 1 further comprising a plurality of elongate second cooling slots, each second cooling slot having a second longitudinal axis defined therethrough, and the second longitudinal axis of each of said second cooling slots is substantially perpendicular to said axis of rotation.

10. The seal of claim 9 wherein each seal segment further comprises a supply surface radially outward from said sealing surface, a plurality of cooling air inlet orifices extending through said supply surface and into said segment, and a plurality of cooling air passages located entirely between said supply surface and said sealing surface, each passage connecting one of said first and second cooling slots to at least one of said one cooling air inlet orifices, each of said first and second cooling slots communicating with at least one of said inlet orifices through one of said cooling air passages.

11. The seal of claim 10 wherein each passage has a first inner passage surface, and a second inner passage surface radially outward of said first inner passage surface relative to the axis of rotation, each segment includes a plurality of pedestals extending radially of said axis of rotation, and each pedestal connects the first inner passage surface of one of the passages to the second inner passage surface thereof, said pedestals providing a tortuous flow path for cooling air entering the passage through one of said cooling air inlet orifices and flowing through the passage to the cooling slot in communication therewith.

12. The seal of claim 11 wherein each cooling air inlet orifice and the axis of rotation define a reference line that is perpendicular to said axis of rotation, and the cooling slot in communication with each cooling air inlet orifice is in spaced relation to said reference line, thereby causing cooling air entering the passage through one of the cooling air inlet orifices to impinge the first inner passage surface prior to exiting the passage through the cooling slot in communication therewith.

13. The seal of claim 12 wherein each passage has a minimum passage flow area, each of the cooling air inlet orifices has a minimum inlet orifice flow area, and the minimum passage flow area is at least twice the sum of the flow areas of the cooling air inlet orifices in communication therewith.

14. The seal of claim 13 wherein at least some of the first cooling slots are aligned in a first row, said first row defines a first reference plane perpendicular to said axis of rotation, and the second cooling slots are aligned in a second row, said second row defines a second reference plane perpendicular to said axis of rotation.

15. The seal of claim 14 wherein some of the first cooling slots are aligned in a third row, said third row defines a third reference plane perpendicular to said axis of rotation, and the third reference plane is interposed between the first and second reference planes.

16. The seal of claim 15 wherein some of the first cooling slots are aligned in a fourth row, said fourth row defines a fourth reference plane perpendicular to said axis of rotation, and the fourth reference plane is interposed between the third and second reference planes.

* * * * *

UNITED STATES PATENT AND TRADEMARK OFFICE
CERTIFICATE OF CORRECTION

PATENT NO. : 5,649,806
DATED       : July 22, 1997
INVENTOR(S) : Joseph A. Scricca, George W. Kelch It is certified that error appears in the above-indentified patent and that said Letters Patent is hereby corrected as shown below:

In column 1 at line 3, insert --The invention was made under a U.S. Government contract and the Government has rights herein.--

Signed and Sealed this

Nineteenth Day of May, 1998

Attest:

BRUCE LEHMAN

Attesting Officer    Commissioner of Patents and Trademarks